(12) United States Patent
Fuller

(10) Patent No.: US 11,486,519 B2
(45) Date of Patent: Nov. 1, 2022

(54) FLEXIBLE HOSE

(71) Applicant: ROLLS-ROYCE PLC, London (GB)

(72) Inventor: Simon L Fuller, Derby (GB)

(73) Assignee: ROLLS-ROYCE plc, London (GB)

( * ) Notice: Subject to any disclaimer, the term of this patent is extended or adjusted under 35 U.S.C. 154(b) by 1066 days.

(21) Appl. No.: 15/474,076

(22) Filed: Mar. 30, 2017

(65) Prior Publication Data
US 2017/0314709 A1 Nov. 2, 2017

(30) Foreign Application Priority Data

Apr. 28, 2016 (GB) ...................................... 1607372

(51) Int. Cl.
F02C 7/22 (2006.01)
F16L 11/14 (2006.01)
F23K 5/02 (2006.01)
F16L 11/15 (2006.01)
F16L 11/20 (2006.01)
F16L 13/02 (2006.01)

(52) U.S. Cl.
CPC .............. F16L 11/14 (2013.01); F02C 7/222 (2013.01); F16L 11/15 (2013.01); F16L 11/20 (2013.01); F23K 5/02 (2013.01); F05D 2240/35 (2013.01); F05D 2260/607 (2013.01); F16L 13/02 (2013.01); F23K 2900/05142 (2013.01)

(58) Field of Classification Search
CPC ...... F16L 11/081; F16L 11/082; F16L 11/083; F16L 11/085; F16L 11/088; F16L 11/121; F16L 11/14; F16L 11/15; F16L 11/20; F02C 7/22; F02C 7/228; F23K 2900/05142; F05D 2260/607

USPC ........ 138/121, 122, 129, 131, 134, 137, 140
See application file for complete search history.

(56) References Cited

U.S. PATENT DOCUMENTS 1,819,175 A * 8/1931 James ................... B29D 23/18
                                                              138/122
2,722,437 A * 11/1955 Phillips .................. F16L 33/26
                                                              285/222.5
(Continued)

FOREIGN PATENT DOCUMENTS

CN        105065806 A       11/2015
DE    10 2013 111737 A1     4/2015
(Continued)

OTHER PUBLICATIONS

Oct. 27, 2016 Search Report issued in British Patent Application No. 1607372.8.

(Continued)

Primary Examiner — Todd E Manahan
Assistant Examiner — Sean V Meiller
(74) Attorney, Agent, or Firm — Oliff PLC

(57) ABSTRACT

The present invention provides a flexible hose for connecting a fuel manifold to a burner of a gas turbine engine. The flexible hose includes a metal convolute tube, an elongate member or members located in grooves formed in the inner surface of the convolute tube, and a pressure-containing sheath outside the convolute tube. The flexible tube has end connectors fluidly-tightly joined to respective ends of the hose for connection at one end of the hose to the fuel manifold of the gas turbine engine, and at the other end of the hose to the burner of the gas turbine engine.

8 Claims, 4 Drawing Sheets

(56) References Cited

U.S. PATENT DOCUMENTS

| | | | | |
|---|---|---|---|---|
| 4,811,761 A * | 3/1989 | Huvey | ..................... | F16L 11/11 |
| | | | | 138/122 |
| 9,534,713 B2 * | 1/2017 | Castel | ................... | F16L 11/083 |
| 9,857,002 B2 * | 1/2018 | Ott | ........................... | F16L 11/22 |
| 2006/0186664 A1 * | 8/2006 | Huang | .................. | F16L 11/081 |
| | | | | 285/242 |

FOREIGN PATENT DOCUMENTS

| | | | | |
|---|---|---|---|---|
| FR | 2571814 A1 * | 4/1986 | ............ | F16L 11/115 |
| FR | 2571814 A1 | 4/1986 | | |
| GB | 760640 A | 11/1956 | | |
| GB | 769993 A | 3/1957 | | |
| WO | 98/32957 A1 | 7/1998 | | |

OTHER PUBLICATIONS

Sep. 8, 2017 Search Report issued in European Patent Application No. 17163819.

\* cited by examiner

FLEXIBLE HOSE

FIELD OF THE INVENTION

The present invention relates to flexible hoses e.g. for use in gas turbine engine combustion equipment. In particular, it relates to flexible hoses used for connecting a fuel manifold of a gas turbine engine to a burner of the gas turbine engine.

BACKGROUND

A gas turbine engine has combustion equipment including a plurality of burners which receive fuel from a fuel manifold and direct the received fuel into one or more combustors. In general, flexible hoses are used to connect a rigid fuel manifold to the burners. The hoses allow the burners to move independently of the manifold, e.g. due to vibration and differential thermal effects.

A problem with such flexible hoses is that coke may build-up inside the hose, leading to restrictions or blockages which may disrupt flow within the hoses. Coking is the deposition of solid particulate matter, usually carbon, produced by heat-induced degradation of the fuel.

A known approach to try to prevent build-up of coke inside a hose includes using a multi-layer hose construction as follows:
1) Outer braid layer
2) E-glass layer
3) Pressure-containing braid
4) Fuel-carrying polytetrafluoroethylene (PTFE) tube In such a construction, the PTFE tube forms the fuel-contacting, inner surface of the hose. The low coefficient of friction of PTFE can reduce build-up of coking inside the hose. However, PTFE-containing hoses are susceptible to overheating due to the relatively low thermal conductivity of PTFE. Additionally, PTFE degrades at elevated temperatures above approximately 350° C. Therefore, PTFE-containing hoses are not suitable for use at very high temperatures.

End connectors for connecting to a manifold and a burner may be joined to the hose by crimping the connectors to respective ends of the hose. In particular, being a mechanical process that does not require heating of the hose, crimping is compatible with PTFE-containing hoses. However, the reliability of crimped joints may be variable, raising a concern that crimped end connectors may lose fluid-tightness.

SUMMARY

The present invention aims to address the above problems.

Accordingly, in a first aspect, the present invention provides a flexible hose for connecting a fuel manifold to a burner of a gas turbine engine, the hose having:
- a metal convolute tube;
- an elongate member or members located in grooves formed in the inner surface of the convolute tube;
- a pressure-containing sheath outside the convolute tube; and
- end connectors fluidly-tightly joined to respective ends of the hose for connection at one end of the hose to the fuel manifold, and at the other end of the hose to the burner.

By a "convolute tube" we preferably mean a tube having a plurality of grooves formed at least in an inner surface of the tube. Typically, a convolute tube has a plurality of grooves formed in an inner surface and a plurality of grooves formed in an outer surface of the tube. A "corrugated tube" is a particular form of convolute tube. In a corrugated tube, spiralling grooves on the inside of the tube or discrete, axially spaced ring grooves on the inside of the tube match corresponding spiralling/ring projections on the outside of the tube. Similarly, spiralling/ring grooves on the outside of the tube match corresponding spiralling/ring projections on the inside of the tube. The grooves of a convolute tube generally increase the flexibility of the tube as compared to a similar tube without grooves. This increased flexibility can thereby allow the tube to achieve a smaller bend radius.

In a second aspect, the present invention provides gas turbine engine combustion equipment having a fuel manifold (typically a rigid fuel manifold) and a plurality of burners which receive fuel from the fuel manifold and direct the received fuel into one or more combustors, the burners being connected to the manifold by respective flexible hoses of the first aspect.

In a third aspect, the present invention provides a gas turbine engine having the combustion equipment of the second aspect.

Advantageously, the location of the elongate member(s) in the grooves in the inner surface of the convolute tube can help to prevent build-up of coke within the tube. In particular, vibration of the elongate member(s) in use can dislodge any coke particles, which are then flushed out of the hose by the flow of fuel. Also, other anti-coking measures, such as PTFE layers, may not be needed, which can help to improve the temperature capability of the hose.

Optional features of the invention will now be set out. These are applicable singly or in any combination with any aspect of the invention.

The grooves in the inner surface of the convolute tube may be spiral grooves or axially spaced ring grooves. The profile of the grooves is not particularly limited, but is typically smoothly curved. The axial spacing of the grooves is not particularly limited, but for example the axial spacing may be equal to or less than the internal diameter of the tube, and preferably the axial spacing may be equal to or less than the internal radius of the tube. In general, the smaller the axial spacing of the grooves, the greater the flexibility of the tube.

The, or each, elongate member may conform to the shape of the grooves in the inner surface of the convolute tube. For example, in the case that the grooves are spiral grooves, the, or each, elongate member may have a helical shape. Conveniently, the, or each, elongate member can be a helical spring. The, or each, elongate member may have a circular, semi-circular, or any other suitable cross-sectional shape. The cross-sectional shape of the elongate member may be appropriately selected in order to reduce turbulence of fluid flow through the convolute tube. For example, in a convolute tube having inner surface grooves with semi-circular cross-sections, the cross-sectional shape of the elongate member(s) may be correspondingly semi-circular so that member(s) locate securely in the grooves while presenting a relatively smooth surface to the fluid flow. The, or each, elongate member may be formed of metal, which may improve the temperature capabilities of the hose.

The pressure-containing sheath may preserve the stability of the convolute tube when the convolute tube has a high internal pressure. The pressure-containing sheath may cover substantially the entire outer surface of the convolute tube. The pressure-containing sheath may, for example, be a braided sheath, such sheathes being highly flexible. The sheath may be formed of metal, which may improve the temperature capabilities of the hose.

The end connectors may be joined to the flexible hose by welding or brazing. Advantageously, welding or brazing can make highly reliable fluid-tight joints. Preferably, the end connectors are joined to the flexible hose by welding or brazing to the metal convolute tube.

The hose may be single layer hose, or a concentric double layer hose. A concentric double layer hose may be used, for example, in lean burn fuel systems. A concentric double layer hose may include: an inner metal convolute tube, and an outer metal convolute tube, an annular passage being formed between the inner and outer tubes; respective elongate member or members located in grooves formed in the inner surface of each convolute tube; a pressure-containing sheath outside the outer convolute tube; and end connectors fluidly-tightly joined to respective ends of the hose for connection of the inner and outer convolute tubes at one end of the hose to respective fuel manifolds, and at the other end of the hose to respective fuel passages of the burner. Such a concentric double layer hose can allow for two separate fuel flows within one hose, i.e. one flow within the annular passage and another flow within the central bore of the inner tube. These may be, for example, a mains flow and a pilot flow. The respective diameters of the inner and outer convolute tubes may be selected according to the desired rates of the fluid flows.

Embodiments of the invention will now be described by way of example with reference to the accompanying drawings in which.

Figure 3A:
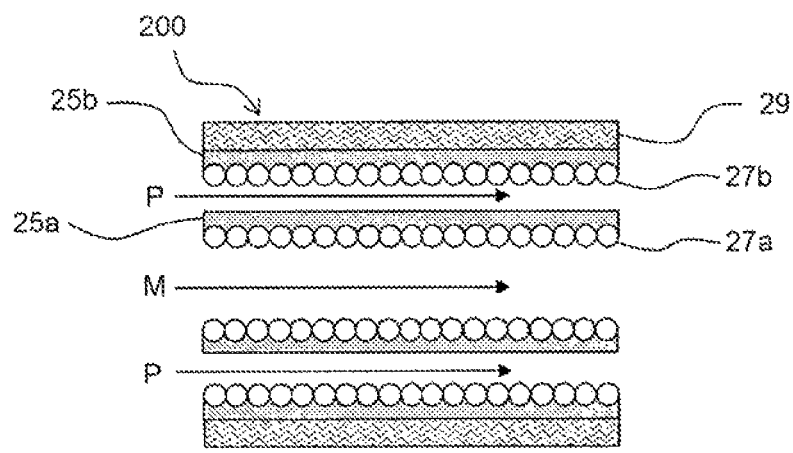
Figure 3B:
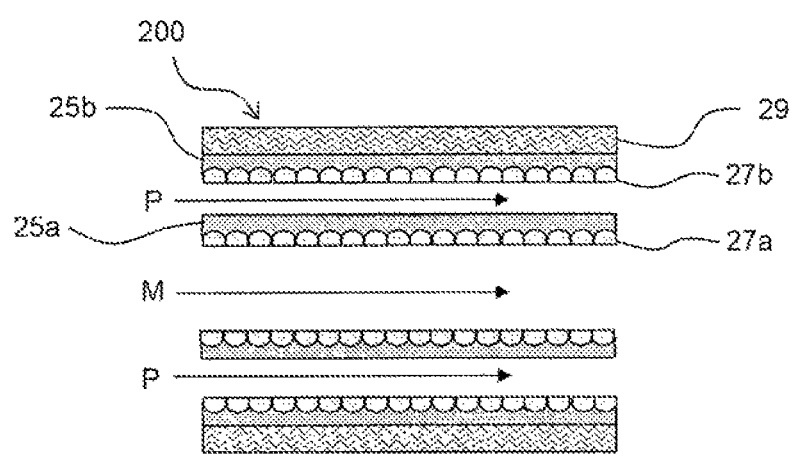
Figure 4:
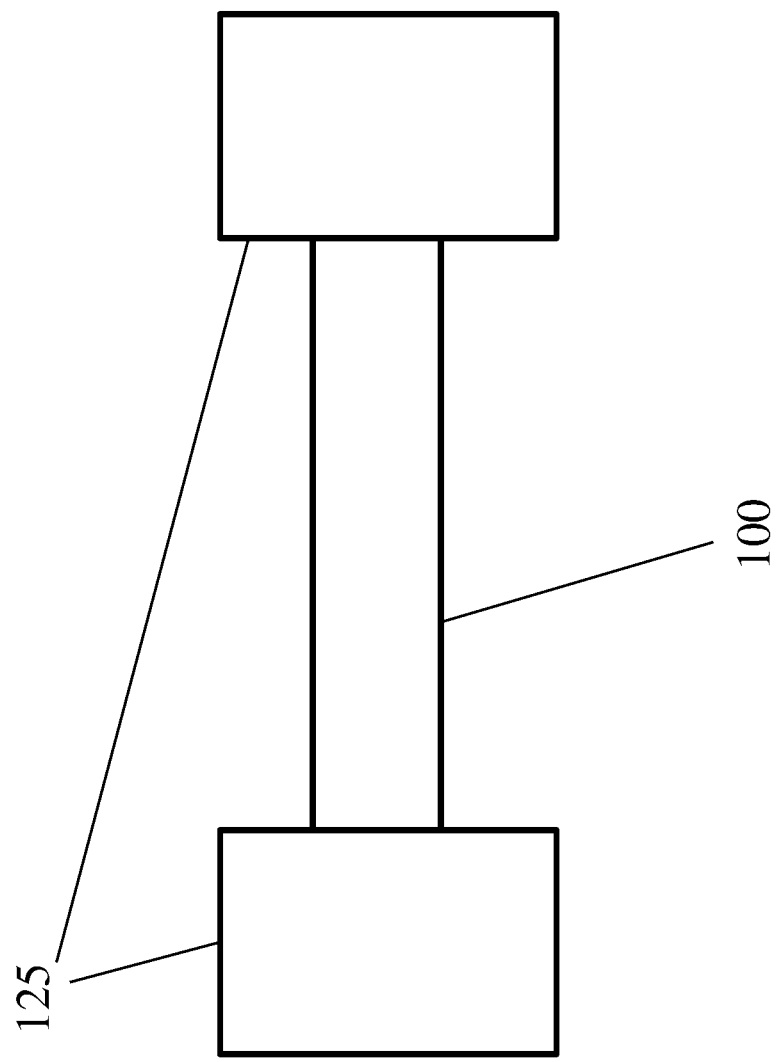
Figure 5:
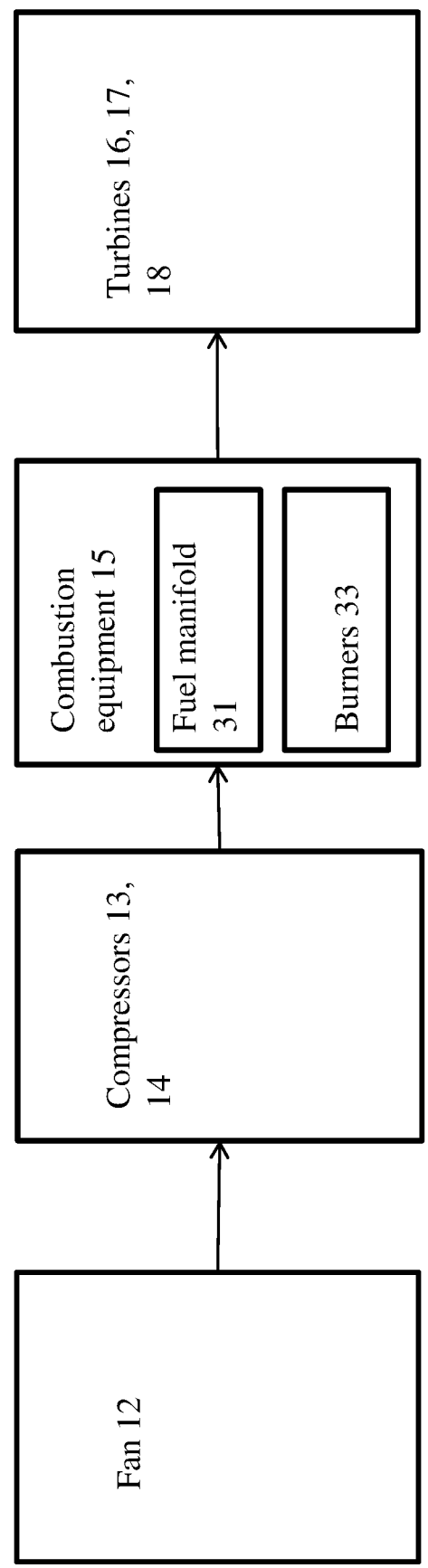

FIGS. 3(*a*) and 3(*b*) show schematic longitudinal cross-sections through (a) a concentric double layer hose in which the elongate members have circular cross-sections, and (b) a concentric double layer hose in which the elongate members have semi-circular cross sections;

FIG. 4 shows end connectors connected to a flexible hose in block diagram form; and FIG. 5 shows a fan, compressors, combustion equipment, a fuel manifold, burners, and turbines of the gas turbine engine in block diagram form.

DETAILED DESCRIPTION AND FURTHER OPTIONAL FEATURES

Figure 1:
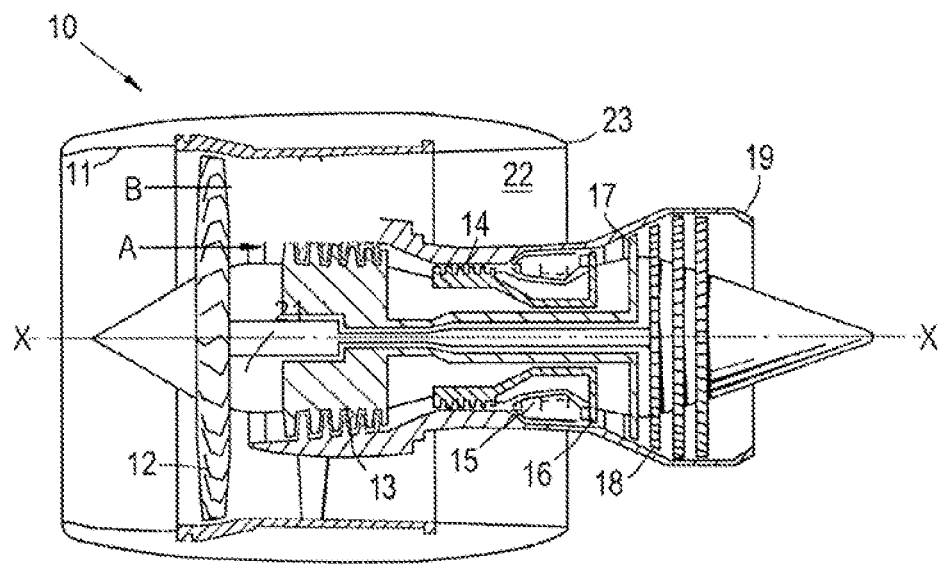
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23. FIG. 5 illustrates some of the components of the gas turbine engine in a simplified block diagram form, namely, the fan 12, the compressors 13 and 14, the combustion equipment 15, fuel manifold 31, burners 33, and turbines 16, 17, and 18.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Figure 2:
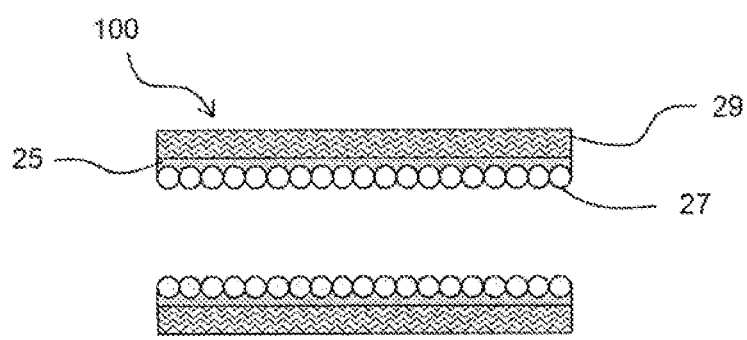
FIG. 2 shows a schematic longitudinal cross-section through a flexible hose.

FIG. 2 shows a schematic longitudinal cross-section through a flexible hose 100 for connecting a rigid fuel manifold of the combustion equipment 15 to a burner. End connecters 125 (see FIG. 4) are welded to respective ends of the hose for connection at one end to the fuel manifold, and at the other end of the hose to the burner. The hose has a metal convolute tube 25, which has spiral grooves formed in an inner surface thereof. An elongate member 27, in the form of a helical metal spring is located within the grooves. A braided metal, pressure-containing sheath 29 covers substantially all of the external surface of the convolute tube 25.

In use, as fuel flows through the flexible hose 100 from the manifold to the burner, general engine vibrations cause the elongate member 27 to vibrate within the tube 25. This prevents build-up of coke within the convolute tube 25, the vibration helping to dislodge any particulate matter that has accumulated.

The welding of the end connectors to respective ends of the metal convolute tube 25 creates reliable fluid-tight joints between the manifold and the flexible hose, and the flexible hose and the burner respectively.

FIG. 3(*a*) shows a schematic longitudinal cross-section through a concentric double layer hose 200. The hose has an inner 25*a* and an outer 25*b* metal convolute tube, each with just inner grooves. Inner 27*a* and outer 27*b* elongate members, both in the form of helical springs, are respectively located within the grooves of the inner and outer metal convolute tubes. Two separate fuel flows are transported by the concentric double layer hose 200: the inner metal convolute tube 25*a* carries a mains fuel flow M in its central bore, and the outer metal convolute tube 25*b* carries a pilot fuel flow P in the annular passage formed between the inner and outer convolute tubes. A braided metal, pressure-containing sheath 29 covers substantially all of the external surface of the outer convolute tube 25*b*. End connecters 125 are welded to respective ends of the hose for connection at one end of the hose to the respective fuel manifolds which provide the separate fuel flows, and at the other end of the hose to respective fuel passages of the burner.

Again, vibration of the elongate members 27*a, b* can prevent build-up of coke within the tubes 25*a, b*, and welding of the end connectors creates reliable fluid-tight joints.

FIG. 3(*b*) shows a schematic longitudinal cross-section through a concentric double layer hose 200 similar to that shown in FIG. 3(*a*), but wherein each of the elongate members 27*a, b* is a half-moon spring with a semi-circular cross section. The semi-circular cross-section allows the elongate members 27*a, b* to locate securely in the grooves of their respective metal convolute tubes 25*a, b* whilst presenting a relatively smooth surface to the fluid flows to reduce turbulence. Elongate members having such cross-sections can equally be adopted in flexible hoses of the type shown in FIG. 2.

While the invention has been described in conjunction with the exemplary embodiments described above, many equivalent modifications and variations will be apparent to those skilled in the art when given this disclosure. For example, the convolute tubes may have (e.g. spiral) grooves on their outer surfaces as well as their inner surfaces. Accordingly, the exemplary embodiments of the invention set forth above are considered to be illustrative and not limiting. Various changes to the described embodiments may be made without departing from the spirit and scope of the invention.

The invention claimed is:

1. A method comprising:
operating a gas turbine engine combustion apparatus that includes a fuel manifold, a plurality of burners, one or more combustors, and a plurality of flexible hoses, the burners being connected to the manifold by the respective flexible hoses, wherein the burners receive fuel from the manifold via the flexible hoses and direct the received fuel into the one or more combustors, each flexible hose including a metal convolute tube having grooves formed on an inner surface thereof; an elongate member or members located in the grooves; a pressure-containing sheath disposed outside of the convolute tube; and end connectors fluidly-tightly joined to respective ends of each hose for connection at one end of each hose to the fuel manifold, and at the other end of each hose to the burner; and
causing each elongate member to vibrate within the metal convolute tube and independently of the metal convolute tube so as to actively disperse particulate matter that accumulates within the metal convolute tube.

2. The method of claim 1, wherein the inner surface of the metal convolute tube is spirally grooved.

3. The method of claim 1, wherein each elongate member has a helical shape.

4. The method of claim 1, wherein each elongate member is formed of metal.

5. The method of claim 1, wherein the end connectors are welded or brazed to the metal convolute tube at the ends of each hose.

6. The method of claim 1, wherein each pressure-containing sheath is a braided sheath.

7. The method of claim 1, wherein each hose is a concentric double layer hose, and each hose further includes:
a second metal convolute tube disposed inside of the metal convolute tube and having second grooves formed on an inner surface thereof; and
a second elongate member or second elongate members located in the second grooves.

8. The method of claim 1, wherein the gas turbine engine combustion apparatus is a component of a gas turbine engine.

* * * * *